United States Patent Office 2,808,542
Patented Oct. 1, 1957

2,808,542

FOIL FOR ELECTROLYTIC CONDENSERS AND PROCESS

David A. Vermilyea, Latham, N. Y., assignor to General Electric Company, a corporation of New York No Drawing. Application December 28, 1953, Serial No. 400,749

4 Claims. (Cl. 317—230)

This invention relates to oxide film-covered metallic bodies. More particularly, it relates to the art of manufacturing metal foil having an anodized oxide film on its surface to be used in electrolytic condensers or capacitors and to electrolytic capacitors made from such coated metal foils.

As is well known in the capacitor art, modern electrolytic capacitors are commonly made by simultaneously winding a plurality of elongated strips of metal foil, at least one of the foil strips having an oxide-covered surface, and correspondingly dimensioned and shaped strips of gauze into a cylindrical-shaped coil, the gauze acting as a separator between the adjacent layers of foil. In these capacitors, the oxide film acts as a dielectric. The gauze is saturated or impregnated with a suitable electrolyte. This composite coil is enclosed in a suitable closed receptacle which acts to prevent drying of the electrolyte. Of course, appropriate electrical connections are also provided.

The metal foil can be made by rolling a suitable metal, such as, for example, tantalum, zirconium, titanium, or any metal having appropriate electrical characteristics, formability, and upon which a suitable dielectric oxide film may be formed.

It is widely known that identically constructed electrolytic capacitors frequently have quite different electrical characteristics and particularly some may have a comparatively short life. When these unsatisfactory capacitors were examined after failure, it was found in a great many cases that the oxide film had broken down, causing the capacitor to fail.

It is, therefore, an object of my invention to provide a more stable dielectric film on metallic foil for electrolytic capacitors.

It is a further object of my invention to provide a metallic foil for electrolytic capacitors having surface characteristics which will enable a more stable dielectric oxide film to be formed thereon.

It is still a further object of my invention to provide an oxide coated tantalum foil for use in electrolytic capacitors which has a much longer life under higher voltages.

The failures caused by oxide film breakdown have been particularly troublesome in the manufacture of tantalum foil capacitors. In the following disclosure whenever the word "foil" is used it will be understood to refer to tantalum foil. In attempting to account for the anomalous behavior of some of otherwise identical condensers, the various steps in assembly were eliminated as a factor, there was found to be no significant variation in either the gauze or electrolyte, and the differences in the chemical analyses and metallurgical characteristics of foils from which both satisfactory and unsatisfactory capacitors had been made were found to be insignificant. Inasmuch as the procedure for forming the oxide film was rigidly controlled, I perceived that some surface condition of the foil is critical.

Upon comparison of samples of foil which, when made into capacitors, give acceptable service with samples of foil which do not, no reliable difference in macroscopic appearance can be noted. In fact, even with foils which have surfaces which are almost mirror-like, frequently those which appear to be the smoothest give the poorest service. Even under microscopic examination, no significant difference can be observed until about 1000 diameters magnification or greater is used. At these higher magnifications, the foils are observed to have a number of small surface irregularities. The unsatisfactory foils usually contain more such surface irregularities per unit area than do the foils from which satisfactory condensers can be made. These surface imperfections are relatively sharp in configuration and are apparently caused by the rolling operation, since they appear in foils compared in the "as-rolled" condition, having only been subjected to conventional degreasing and cleansed of surface oils and such surface dirt as may be found on them.

I conceived that these rough portions of the foil surface having quite sharp edges were responsible for the failure of the anodic oxide coating, and that if such sharp, rough portions could be eliminated, a superior condenser could be made.

In the past it has been proposed that electrolytic condenser foils might be improved by drastically etching their surfaces in order to roughen the surface and thereby increase the capacity of the condenser by increasing the area of the foil. I have discovered that my treatment, which actually smooths or polishes the surface of the foil, rather than roughening it, promotes a longer capacitor life by enabling a more uniform and stable oxide film to be formed thereon, and also significantly increases the capacity.

I have further discovered that the best obtainable foils as rolled have surfaces covered with sharp-pointed or edged ridges and grooves or scratches interspersed between the ridges. The general cross-sectional configuration of these irregularities could, for want of a better comparative term, be called "saw-toothed." In foils having smoother appearing surfaces, when viewed microscopically, these "saw-teeth" have been found in some cases to have a "pitch," or generally speaking, a dimension across the ridge measured from groove to groove, of the order of $10^{-4}$ centimeter and smaller. These microscopic sharp-edged projections and grooves are frequently superimposed over larger masses of metal which form a grosser deviation from a true planar surface, much in the nature of small sharp ridges on the surface of larger, more gently contoured ridges. These larger ridges and grooves are frequently of the order of $10^{-3}$ centimeter. These sharply contoured surface imperfections are usually only clearly seen at magnifications in excess of 1500 diameters. In fact, to clearly see the smaller defects, it is sometimes necessary to inspect the surface at magnifications attainable only with the electron microscope.

These foils, it should be noted, have the best obtainable as-rolled surface.

I have further discovered that if the best obtainable "smooth," as-rolled, foil is subjected to an acid treatment bath composed essentially of 5 parts by volume sulfuric acid, 2 parts nitric acid and 1.5 parts hydrofluoric acid at room temperature for a short time, for example, 5 to 10 seconds, followed by washing with water, these sharp surface imperfections will be removed.

It should be noted that the acids referred to in the above solution are "commercial" grade and not pure. For example, the sulfuric acid is 95.5 percent, by weight, pure, the nitric acid 70 percent, by weight, pure and the hydrofluoric acid 48 percent, by weight, pure. While it is preferred that no water be added to the solution, as such, it is to be recognized that these commercial grade acids contain water. Further, the solution may contain water in excess of that carried by the acids up to a maximum of 20 percent by volume. Above this amount, the solution loses its ability to effectively treat the foil surface. It has been found that the composition of this solution may be varied through the following ranges: 40 to 80, preferably about 55, percent by volume 95.5 percent sulfuric acid, 15 to 40, preferably about 25, percent by volume 70 percent nitric acid and 10 to 35, preferably about 20, percent by volume 48 percent hydrofluoric acid. This treatment, it is important to note, does not "etch" the surface, thereby producing sharply contoured edges, but rather preferentially attacks and removes the sharp-pointed "saw-tooth" profile. The surface after treatment is characterized by an absence of these sharp edges or points and any deviation from a planar surface of the actual surface is by gentle, smooth curves. Foil thus treated is then subjected to any conventional anodizing treatment to form a stable, adherent oxide film upon its surface. The coated foil may be then simultaneously wound with other foil, which may be coated or uncoated, and permeable membrane separating material such as gauze, as stated supra. A suitable container or receptacle is provided for the wound composite, the permeable membrane being saturated with an electrolyte. The foils may be provided with electrical connectors extending to the exterior of the container and the container sealed to prevent electrolyte loss by drying.

The superiority of these dip-treated foils for electrolytic capacitors may be illustrated by a comparison of a sample of untreated foil from which capacitors have been made having acceptable performance characteristics and a sample of foil which has received my treatment. These two foil samples were subjected to the same standard anodizing process to produce apparently identical oxide films on each of their surfaces. It should be noted that any satisfactory oxide film-forming procedure may be used. For example, a satisfactory oxide film may be formed by making the foil to be coated the anode in an electrolyte composed of a dilute aqueous solution of sodium sulfate or sodium borate, or any other suitable salt, and applying up to 500 volts. The concentration of the salt in the electrolyte may be of the order of 1 percent, by weight, for satisfactory results, and the reaction may conveniently be carried out at room temperature.

| Material | Tested in— | |
|---|---|---|
| | 2% $HNO_3$ mfd./in.$^2$ | 0.2% $Na_2B_4O_7$ $\mu a./in.^2$ at 150 v. |
| Dip-treated Ta foil | .736<br>.732 | 2.4<br>2.4 |
| Untreated "acceptable" Ta foil | .696<br>.698 | 26.4<br>30.4 |

Note.—Mfd./in.$^2$ represents capacity in microfarads per square inch. $\mu a./in.^2$ represents leakage in milliamperes per square inch.

From the above table, it is apparent that the capacity of the dip-treated foil is significantly greater than the untreated foil. The leakage current is lower by a factor of 10 than the acceptable foil. It has also been found that the treated foil lasted about 268 hours before failure when aged in a cell at 300 volts, compared to about 196 hours for acceptable untreated foil. It should be noted that the data set forth in the above table is expressed, as is customary in such tests, on the basis of projected area, i. e., as though the foil only has one side.

I have also discovered that similar results may be obtained by treating rolled foil by known electropolishing techniques. Such techniques are well known and as such form no part of my invention. These electropolishing techniques are obviously more expensive and complex than my said dip procedure which requires merely the steps of immersion in the acid bath followed by an acid removing wash.

What I claim as new and desire to secure by Letters Patent of the United States is:

1. A process for producing a smooth surface on tantalum foil for use in electrolytic capacitors comprising the steps of subjecting the rough surface of as-rolled foil to a solution consisting essentially of 5 parts by volume sulfuric acid, 2 parts by volume nitric acid and 1.5 parts by volume hydrofluoric acid for from 2 to 10 seconds and then removing the acid solution by washing, whereby sharply contoured microscopic surface irregularities are removed without etching the surface.

2. A process for producing a smooth surface on tantalum foil for use in electrolytic capacitors comprising the steps of subjecting the rough surface of as-rolled foil to a solution consisting essentially of 40 to 80 percent by volume 95.5 percent sulfuric acid, 15 to 40 percent by volume 70 percent nitric acid, 10 to 35 percent by volume 48 percent hydrofluoric acid and up to 20 percent by volume water and then removing the acid solution by washing whereby sharply contoured microscopic surface irregularities are removed without etching the surface.

3. A process for producing a smooth surface on tantalum foil for use in electrolytic capacitors comprising the steps of subjecting the rough surface of as-rolled foil to a solution comprising about 55 percent by volume 95.5 percent sulfuric acid, about 25 percent by volume 70 percent nitric acid and about 20 percent by volume 48 percent hydrofluoric acid for from 2 to 10 seconds and then removing the acid solution by washing, whereby sharply contoured microscopic surface irregularities are removed without etching the surface.

4. A tantalum foil having a smooth surface resulting from treatment by the process set forth in claim 1, said surface being substantially covered by an adherent, stable oxide film.

References Cited in the file of this patent

UNITED STATES PATENTS

| 2,122,756 | Schnoll | July 5, 1938 |
| 2,337,062 | Page | Dec. 21, 1943 |
| 2,428,749 | De Long | Oct. 7, 1947 |